United States Patent

[11] 3,557,858

| [72] | Inventors | Giuseppe Lugli |
| | | Luigi Maiocchi, Milan, Italy |
| [21] | Appl. No. | 866,774 |
| [22] | Filed | Oct. 15, 1969 |
| | | Continuation of Ser. No. 666,260, Sept. 8, 1967, abandoned. |
| [45] | Patented | Jan. 26, 1971 |
| [73] | Assignee | Pirelli S. p. A. |
| | | Milan, Italy |
| [32] | Priority | Oct. 25, 1966 |
| [33] | | Italy |
| [31] | | 29-262-A66 |

[54] TREAD RING FOR REMOVABLE TREAD TIRES
4 Claims, 2 Drawing Figs.

[52] U.S. Cl.................................................. 152/187, 152/361
[51] Int. Cl..................................................... B60c 11/02

[56] References Cited

UNITED STATES PATENTS

| 3,093,181 | 6/1963 | Beckadolph.................. | 152/361 |
| 3,233,649 | 2/1966 | Jolivet et al................... | 152/361 |
| 3,240,249 | 3/1966 | Lugli............................ | 152/176 |

*Primary Examiner*—Arthur L. La Point
*Assistant Examiner*—George H. Libman
*Attorney*—Stevens, Davis, Miller & Mosher ABSTRACT: A tread ring for a pneumatic tire of the removable tread type, having an armor resistant to tension in the longitudinal direction of the tread ring, and two strips of metal cords parallel to one another in each strip, disposed along two directions crossed with respect to the midcircumferential plane of the tread ring and extending at angles to said plane. One of the strips extends internally and the other externally with respect to the armor.

PATENTED JAN 26 1971

3,557,858

INVENTORS
GIUSEPPE LUGLI
LUIGI MAIOCCHI

BY Stevens, Davis, Miller & Mosher
ATTORNEYS

TREAD RING FOR REMOVABLE TREAD TIRES

This application is a continuation of Ser. No. 666,260, filed Sept. 8, 1967, now abandoned.

BACKGROUND OF THE INVENTION

1. Field of the Invention

The present invention relates to a pneumatic tire in which the tread is separate from the carcass, and, more particularly, to such a tire wherein the tread is held on the carcass by means of the friction forces generated by the inflation pressure of the tire.

2. Prior Art

In the art of removable tread tires, it is generally known to provide a group of reinforcing members in the tread ring, which reinforcing members usually include a tension-resisting armor one or more strips of metal fabric external to said armor and one or more strips of textile fabric internal to said armor.

The tension-resisting armor is usually composed of a single helically wound metal cord, whose coils are disposed in a direction substantially parallel to the longitudinal direction of the tread, in order to withstand the expansion of the carcass and thus generate the friction forces able to anchor the tread ring on the carcass.

The strip of metal fabric usually disposed in a radially outward position with respect to the armor is normally utilized to protect the latter against punctures and ruptures due to impacts, and to distribute the concentrated stresses caused for example by a small obstacle engaging the wide portion of the tread. These outer strips have also a desirable effect on the transversal rigidity of the tread ring and therefore on the drift characteristics of the tire. To obtain the best results, at least two outer strips are utilized, in which case the cords of each pair are disposed along two directions crossed to each other and with respect to the midcircumferential plane of the tread ring. Moreover, these cords usually extend at angles ranging between 25° and 65°, and preferably between 30° and 50°, with respect to the midcircumferential plane of the tread ring.

The inner textile strip of these known tires is normally utilized to maintain the coils of the armor in the right position during the manufacture of the ring, and to prevent the coils from cutting the underlying rubber layer in severe service condition. This inner textile strip is usually constituted by transversal cords forming angles of 90° with respect to the midcircumferential plane of the tread ring.

Although the results achieved with the above-described arrangement are quite desirable, the tread ring is usually relatively stiff, and difficult and expensive to manufacture.

SUMMARY OF THE INVENTION

It is therefore an object of the present invention to provide a tread ring which has an increased flexibility, which is simple to manufacture, and which can be manufactured with a considerable saving of material. It is a further object of the present invention to provide a pneumatic tire incorporating the above-described tread ring.

Briefly summarized, the tread ring of the present invention includes a helically wound metal cord, the coils of which are disposed in the tread ring in a direction substantially parallel to the longitudinal direction thereof; and two strips of metal cords extending parallel to one another in each strip, disposed along two directions crossed with respect to the midcircumferential plane of the tread ring, and forming with the latter angles ranging between 25° and 65°, and preferably between 30° and 50°. The two strips are disposed in a radially inner position and in a radially outer position, respectively, with respect to the helically wound metal cord.

The width of the strip internal of the wound metal cord must be at least equal to the width of the latter, and the external strip may have a slightly reduced width with respect to that of the wound metal cord. In any case, the width of the external strip must not be smaller than 60 percent of the width of the wound metal cord.

BRIEF DESCRIPTION OF THE DRAWINGS

The present invention will now be better illustrated with reference to the attached drawings, given by way of example, in which.

DESCRIPTION OF THE PREFERRED EMBODIMENTS

Figure 1:
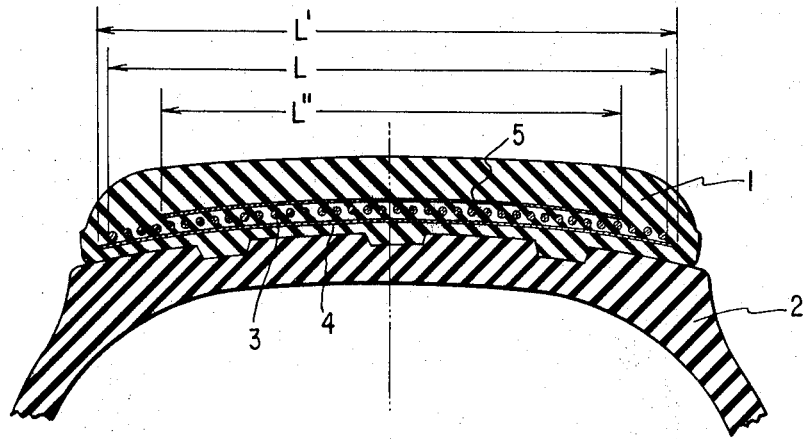
FIG. 1 is the sectional view of a pneumatic tire in accordance with the present invention.

Referring specifically to FIG. 1 of the drawings, a removable tread tire is shown which consists of a tread ring 1, adapted to frictionally engage a carrying casing 2 by means of the inflation pressure of the tire. A 11.00—20 size tire is depicted for the purpose of illustration, it being understood that any size tire is within the scope of the invention.

Figure 2:
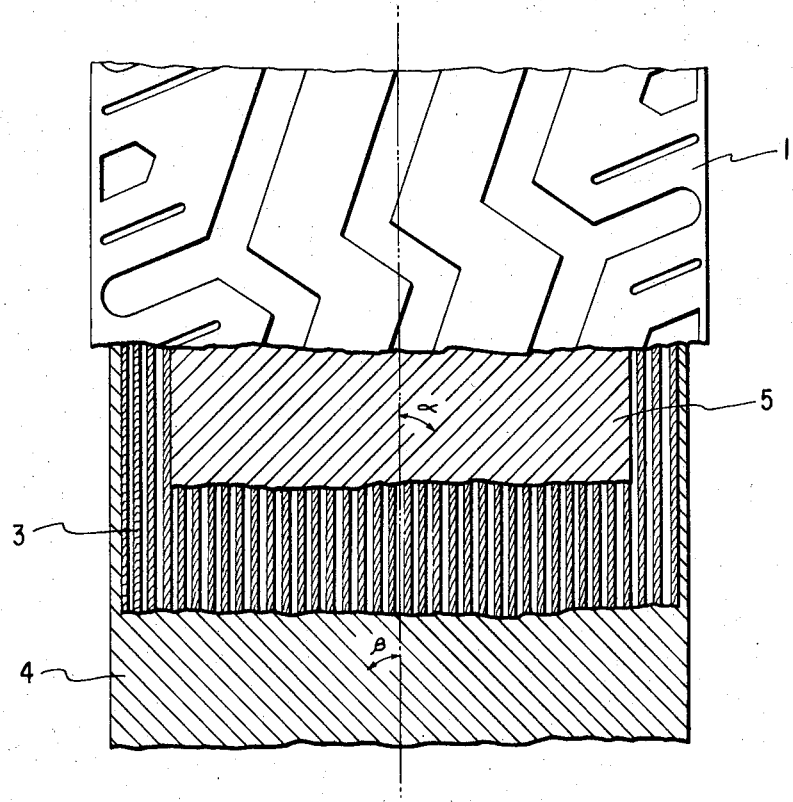
FIG. 2 is a plan view of the tread ring shown in FIG. 1 with parts broken away to show the disposition of the cords inside the tread ring.

Inside the tread ring 1 there is disposed an armor 3, constituted by a metal cord helically wound up to form a single strip extending substantially across the width of the tire as shown in FIG. 1, the coils of the helix being disposed in a direction substantially parallel to the longitudinal direction of the tread ring as shown in FIG. 2. The metal cord may, for example, have a 7(7 × 3)/0,15 formation and a diameter of 2,7 mm., and the armor 3, a width L of 190 mm.

An additional strip 4, formed by a plurality of metallic cords parallel to one another and forming an angle $\beta$ of approximately 45° with respect to the midcircumferential plane of the tread ring is provided in the tread ring in a radially inner position with respect to the armor. This strip 4 may have, for example, a width L' of 195 mm., which is about 3 percent greater than that of the armor 3.

A further additional strip 5, also formed by a plurality of metallic cords parallel to one another, is provided in the tread ring in a radially outer position with respect to the armor 3. In this strip the metallic cords are perpendicular to the cords of strip 4 and are therefore also inclined an angle $\alpha$ of approximately 45° with respect to the midcircumferential plane of the tread ring. The additional strip 5 may have a width L'' of approximately 160 mm., corresponding to about 85 percent of the width L of the armor 3.

In the illustrated example, the cords of the additional strips 4 and 5 have a 7 × 3/0,15 formation and a diameter of 0,9 mm.

As the cords of the additional strips 4 and 5 are not subjected to the tension stresses due to the inflation pressure of the tire, since the latter are completely absorbed by the armor 3, they can be much thinner than the cords of the armor, and this allows them to be more flexible than the latter.

In the thread ring thus formed, the neutral axis always passes in close proximity to the center of the cord forming the helix. Consequently, the distance of the fiber farthest from the neutral axis is obviously smaller than that in the above-described conventional thread rings having at least two outer strips. In fact, these conventional tread rings have a distance equal to the thickness of the two additional strips plus about one-half of the thickness of the cords of the armor, while in the present arrangement, this distance is equal to the thickness of a single additional strip plus one-half of the thickness of the cords of the armor. As the modulus of the flexing resistance depends on this distance, the tread ring in accordance with the present invention is thus more flexible.

At the same time, the presence of one of the two additional strips inside the armor eliminates the textile strip required in previously known arrangements. In fact, the use of the internal strip of the present invention satisfactorily maintains a regular distribution of the coils during the tread ring manufacture and prevents the rubber from being cut by the coils. Furthermore, applicant has discovered that the above-described function and advantages of the metallic strips in the known arrangements are also present in the tread ring of the present invention due to the additional strips.

We claim:

1. A pneumatic tire comprising a carrying casing, and a removable thread ring disposed over said casing, said thread ring comprising an armor resistant to tension in the longitudinal direction of said tread ring, and two strips of metal cords parallel to one another in each strip, disposed along two directions crossed with respect to the midcircumferential plane of said tread ring, and extending at an angle of 25° to 65° with respect to said plane, one of said strips being disposed in a radially inward position with respect to said armor, and the other of said strips being disposed in a radially outward position with respect to said armor, the radial distance from the neutral axis of the ring to the outermost surface of said strips being equal substantially to no more than the thickness of one of said strips plus one-half of the thickness of said armor.

2. A pneumatic time as in claim 1, wherein said armor is formed by a helically wound metal cord, the coils of which are disposed in a direction substantially parallel to the longitudinal direction of said tread ring.

3. A pneumatic tire as in claim 1, wherein the strip radially inward with respect to said armor has a width not smaller than said width of said armor.

4. A pneumatic tire as in claim 1, wherein the strip radially outward with respect to said armor has a width not greater than the width of the armor and not smaller than the 60 percent of the latter.

UNITED STATES PATENT OFFICE
CERTIFICATE OF CORRECTION

Patent No. 3,557,858        Dated January 26, 1971

Inventor(s) Giuseppe LUGLI and Luigi MAIOCCHI

It is certified that error appears in the above-identified patent and that said Letters Patent are hereby corrected as shown below:

Column 2, line 52, "thread" should be -- tread --;
line 56, "thread" should be -- tread --.

Claim 1, line 2, both occurrences, "thread" should be -- tread --.

Claim 2, line 1, "time" should be -- tire --.

Signed and sealed this 17th day of August 1971.

(SEAL)
Attest:

EDWARD M. FLETCHER, JR.
Attesting Officer

WILLIAM E. SCHUYLER, JR
Commissioner of Patents